US012428901B2

(12) United States Patent
MacDonald et al.

(10) Patent No.: US 12,428,901 B2
(45) **Date of Patent: *Sep. 30, 2025**

(54) DOOR ASSEMBLY

(71) Applicant: Endura Products, LLC, Colfax, NC (US)

(72) Inventors: Kevin T. MacDonald, Greensboro, NC (US); Tomasz Jaskiewicz, Oak Ridge, NC (US); Eric Johnson, Edenton, NC (US)

(73) Assignee: Endura Products, LLC, Colfax, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,715

(22) Filed: May 28, 2024

(65) Prior Publication Data

US 2024/0318493 A1 Sep. 26, 2024

Related U.S. Application Data

(63) Continuation of application No. 18/105,988, filed on Feb. 6, 2023, now Pat. No. 11,993,976, which is a continuation of application No. 17/464,833, filed on Sep. 2, 2021, now Pat. No. 11,629,545, which is a continuation of application No. 16/387,589, filed on Apr. 18, 2019, now Pat. No. 11,111,715.

(60) Provisional application No. 62/662,443, filed on Apr. 25, 2018.

(51) Int. Cl.
*E06B 1/52* (2006.01)

(52) U.S. Cl.
CPC .................................... *E06B 1/524* (2013.01)

(58) Field of Classification Search
CPC .................................. E06B 1/524; E06B 1/30
USPC .................................................... 49/501, 504
See application file for complete search history.

(56) References Cited

U.S. PATENT DOCUMENTS

| | | | | |
|---|---|---|---|---|
| 1,141,445 | A | 6/1915 | Davison | |
| 1,723,306 | A * | 8/1929 | Sipe | E04B 1/615 52/396.04 |
| 3,512,819 | A * | 5/1970 | Gillingwater | E04B 1/6158 52/461 |
| 3,685,222 | A * | 8/1972 | Curtess | E04B 1/08 52/211 |
| 3,760,547 | A * | 9/1973 | Brenneman | F16B 5/002 403/292 |
| 3,885,351 | A | 5/1975 | Imperial et al. | |

(Continued)

FOREIGN PATENT DOCUMENTS

| | | | |
|---|---|---|---|
| CA | 2835564 | A1 | 4/2015 |
| CA | 2966673 | A1 | 11/2017 |

(Continued)

*Primary Examiner* — Jason W San
(74) *Attorney, Agent, or Firm* — IceMiller LLP

(57) ABSTRACT

A door assembly is shown and described herein. The door assembly may include at least one door panel and a door frame having a plurality of frame members including a header and a mullion. The invention may also be considered a frame member. The frame member may be a mullion and include a core; and a two-piece top piece adjoining the core to form a structural member. The door assembly may further include at least one adjacent panel. The inventions disclosed are also applicable to jambs and window structures. Also disclosed are methods and assemblies for a mullion door frame member.

8 Claims, 10 Drawing Sheets

(56) References Cited

U.S. PATENT DOCUMENTS 4,115,972 A 9/1978 Varlonga
4,397,117 A 8/1983 Shipp
4,748,780 A 6/1988 Vinther
5,007,222 A * 4/1991 Raymond ............... F24F 13/20 52/775
5,022,206 A 6/1991 Schield et al.
5,058,323 A 10/1991 Gerritsen
5,074,087 A 12/1991 Green
5,435,106 A 7/1995 Garries et al.
5,491,951 A 2/1996 Riegelman
5,511,355 A 4/1996 Dingler
5,539,027 A 7/1996 Deaner et al.
5,577,363 A 11/1996 Tate et al.
5,634,303 A 6/1997 Ellingson
5,695,874 A 12/1997 Deaner et al.
5,773,138 A 6/1998 Seethamraju et al.
5,827,607 A 10/1998 Deaner et al.
5,836,118 A 11/1998 Thornton et al.
5,847,016 A 12/1998 Cope
5,901,510 A * 5/1999 Ellingson .................. E06B 1/32 49/504
5,932,334 A 8/1999 Deaner et al.
5,981,631 A 11/1999 Ronden et al.
5,985,429 A 11/1999 Plummer et al.
5,986,934 A 11/1999 Kao et al.
5,987,843 A 11/1999 Canfield
6,003,277 A 12/1999 Graham et al.
6,004,668 A 12/1999 Deaner et al.
6,011,091 A 1/2000 Zehner
6,015,611 A 1/2000 Deaner et al.
6,015,612 A 1/2000 Deaner et al.
6,066,680 A 5/2000 Cope
6,103,791 A 8/2000 Zehner
6,125,605 A 10/2000 Young
6,143,811 A 11/2000 Oda et al.
6,148,582 A 11/2000 Ellingson
6,248,813 B1 6/2001 Zehner
6,295,779 B1 10/2001 Canfield
6,344,268 B1 2/2002 Stucky et al.
6,344,504 B1 2/2002 Zehner et al.
6,378,266 B1 * 4/2002 Ellingson .................. E06B 1/62 49/504
6,438,919 B1 * 8/2002 Knauseder .............. E04F 15/04 52/592.4
6,453,631 B1 9/2002 Headrick
6,498,205 B1 12/2002 Zehner
6,557,309 B1 5/2003 Johnson
6,590,004 B1 7/2003 Zehner
6,619,005 B1 9/2003 Chen
6,631,595 B1 10/2003 Minter
6,729,091 B1 * 5/2004 Martensson ............ E04F 15/04 52/391
6,745,526 B1 6/2004 Autovino
6,761,008 B2 * 7/2004 Chen ..................... B29C 65/564 52/309.1
6,763,643 B1 * 7/2004 M.ang.rtensson .... E04F 15/102 52/582.1
6,766,621 B2 7/2004 Reppermund
6,780,359 B1 8/2004 Zehner et al.
6,890,965 B1 5/2005 Johnson et al.
6,922,969 B1 8/2005 Nina
6,928,776 B2 8/2005 Hornung
6,971,211 B1 12/2005 Zehner
6,986,934 B2 1/2006 Chen et al.
7,030,179 B2 4/2006 Patterson et al.
7,111,433 B2 9/2006 Kerscher
7,151,125 B2 12/2006 Williams et al.
7,160,601 B2 1/2007 Ellingson
7,186,457 B1 3/2007 Zehner et al.
7,204,059 B2 4/2007 Schiffmann et al.
7,210,274 B2 5/2007 Ballantyne et al.
7,446,138 B2 11/2008 Matuana et al.
7,449,517 B1 11/2008 Rock
7,514,485 B2 4/2009 Frenkel et al.
7,550,404 B2 6/2009 Fisher et al.
7,635,731 B2 12/2009 Sigworth et al.
7,816,431 B2 10/2010 Heath et al.
7,886,501 B2 2/2011 Bartlett et al.
7,908,816 B2 * 3/2011 Grafenauer ............. F16B 5/002 52/471
7,930,866 B2 4/2011 Carlson et al.
7,971,400 B2 7/2011 Boldt et al.
8,266,856 B2 9/2012 Carlson et al.
8,438,808 B2 5/2013 Carlson et al.
8,629,211 B2 1/2014 Lavallee et al.
8,820,032 B2 9/2014 Badger et al.
9,624,677 B2 * 4/2017 Wright .................... E04F 15/04
9,845,633 B2 * 12/2017 Wang ...................... E06B 1/366
10,378,217 B2 * 8/2019 Pervan .............. E04F 15/02038
10,486,399 B2 11/2019 Chen et al.
10,718,151 B2 7/2020 MacDonald et al.
10,968,683 B2 4/2021 Wang et al.
11,105,143 B2 * 8/2021 MacDonald ............ E06B 1/524
11,111,715 B2 * 9/2021 MacDonald .............. E06B 1/30
D947,663 S * 4/2022 MacDonald ................... D8/400
11,629,545 B2 * 4/2023 MacDonald .............. E06B 1/30 49/504
11,993,976 B2 * 5/2024 MacDonald .............. E06B 1/30
2002/0121071 A1 9/2002 Heung-Bin
2002/0174610 A1 11/2002 Bennett et al.
2003/0145542 A1 8/2003 Chen
2007/0022699 A1 2/2007 Wang
2007/0074469 A1 4/2007 Plagemann et al.
2007/0113521 A1 5/2007 Bartlett et al.
2008/0172957 A1 7/2008 Kerscher
2008/0190052 A1 8/2008 Kerscher
2010/0192489 A1 8/2010 An
2013/0152495 A1 6/2013 An et al.
2018/0258684 A1 9/2018 MacDonald et al.
2018/0305975 A1 10/2018 Jaskiewicz
2019/0085617 A1 3/2019 Hooper, Jr. et al.
2019/0211611 A1 7/2019 Hay, III
2019/0226268 A1 7/2019 Luvison
2019/0330911 A1 10/2019 MacDonald et al.
2020/0149341 A1 5/2020 MacDonald et al.
2021/0396068 A1 12/2021 MacDonald et al.
2023/0203877 A1 6/2023 MacDonald et al.
2024/0318493 A1 * 9/2024 MacDonald ............ E06B 1/524

FOREIGN PATENT DOCUMENTS

EP 3339549 B1 5/2020
WO 9722779 A1 6/1997

* cited by examiner

DOOR ASSEMBLY

CROSS REFERENCE TO RELATED APPLICATIONS

This application is a continuation of application Ser. No. 18/105,988 filed Feb. 6, 2023 issued as U.S. Pat. No. 11,993,976 on May 28, 2024, which is a continuation of application Ser. No. 17/464,833 filed Sep. 2, 2021 now U.S. Pat. No. 11,629,545 issued Apr. 18, 2023, which is a continuation of application Ser. No. 16/387,589 filed Apr. 18, 2019, now U.S. Pat. No. 11,111,715 issued Sep. 7, 2021, which claims the benefit of Application No. 62/662,443 filed Apr. 25, 2018, which is hereby incorporated by reference in their entirety for all purposes.

FIELD OF TECHNOLOGY

The present disclosure relates generally to entranceways for a building and, more particularly, to a door assembly for a residence, to frame members and a mullion assembly.

BACKGROUND

Frame components for exterior door systems are exposed to environmental elements and extremes such as moisture, temperature, and sunlight, which can attack and break down the frame material. Protective coatings such as exterior grade paints are typically used not only to improve appearance but also to protect the underlying material, which is traditionally and typically wood. These frame components are also prone to moisture wicking up from their bottom ends. This type of moisture can lead to decay over time, which compromises the appearance and structural integrity of the frame. Alternatives to a traditional wood frame include aluminum cladded wood frames, which can be expensive, vinyl film cladded wood frames, which are not very resistant to impact damage, or all plastic extruded frames, which are not very rigid and are also susceptible to deformation under heat.

Thus, there remains a need for a new and improved door assembly and frame members that are decay resistant while, at the same time, has the appearance and strength of a traditional wood frame door assembly.

SUMMARY

The present disclosure is directed in one embodiment to a door assembly. The door assembly includes at least one door panel and a door frame having a plurality of frame members including a header and at least a pair of side jambs. The frame member includes a core; and a two-piece top piece adjoining the core to form a structural member with the core. In some examples, and the top piece is a composite of cellulosic material and at least one other material. The door assembly may further include an adjacent panel. The adjacent panel may be, in one example, at least one side light panel. In other examples, the panel may be an active panel and/or a passive/fixed panel.

The core is formed of a non-metallic material and preferably the core is a wood. Also, the core may further include a lower portion formed of a decay resistant material. In one embodiment, the lower portion formed of a decay resistant material is a cellulosic-plastic composite. The cellulosic portion of the cellulosic-plastic composite may be a wood fiber. Also, the plastic portion of the cellulosic-plastic composite may be a thermoplastic. In one embodiment, the thermoplastic is a polyethylene.

The two-piece top piece includes a first stop portion and a second rabbet portion. In one embodiment, the two-piece top piece is formed of a decay resistant material. The two-piece top piece may include where a stop portion has a pair of extensions that project into a side wall of the core to secure the stop portion onto the core. The rabbet portion may include a pair of extensions that project into a side wall of the core to secure the rabbet portion to the core.

The two-piece top piece may be a cellulosic-plastic composite. The cellulosic portion of the cellulosic-plastic composite may be a wood fiber. The plastic portion of the cellulosic-plastic composite may be a thermoplastic. In one embodiment, the plastic may be a polyvinyl chloride.

In one embodiment, the amount of cellulosic material in the cellulosic-plastic composite may be between about 20 wt. % and about 70 wt. % of the weight of the cellulosic-plastic composite. The amount of cellulosic material in the cellulosic-plastic composite may be between about 25 wt. % and about 45 wt. % of the weight of the cellulosic-plastic composite. In another embodiment, the amount of cellulosic material in the cellulosic-plastic composite is about 35 wt. % of the weight of the cellulosic-plastic composite.

The thickness of the two-piece top piece may be between about 10% and about 50% of the thickness of the frame member. In other embodiments, the thickness of the two-piece top piece is between about 10% and about 50% of the thickness of the frame member. In one embodiment, the thickness of the two-piece top piece is about 30% of the thickness of the frame member.

Another aspect of the present disclosure is to provide in a door assembly, including a door frame having a plurality of frame members, including a header and at least a mullion, the frame member including a core and a two-piece top piece adjoining the core to form a structural member with the core. The top piece, in this embodiment may be a composite of cellulosic material and at least one other material.

Other embodiments provide an exterior door mullion for a door assembly including a core, a two piece top piece adjoining the core with a set of extensions, a set of recess points within the core and a stop surface formed jointly between an arm of the stop portion and an arm of the rabbet portion. The core may include a core stop end, a core rabbet end, a first core side wall and a second core side wall. Each side wall may form a linear plane along an outer surface of each side wall. The two piece top piece may adjoin the core to form a structural member with the core. The core may have linear planes along each side wall.

The two piece top piece may have a first stop portion and a second rabbet portion, with the stop portion including a pair of extensions that project into a side wall of the core to secure the stop portion onto the core. The rabbet portion may include a pair of extensions that project into a side wall of the core to secure the rabbet portion to the core. The core may include a set of recess points formed in the outer surface of each side wall. The recess points project medially into the core away from the linear plane, each recess point forming a recess face that is configured to mate with a face of one of the extensions. A recess point, in some examples, may be considered a recess or set of recesses in the core.

A stop surface may be formed in part by an arm of the stop portion and in part by an arm of the rabbet portion.

In some examples the rabbet portion may include a pair of arms having outer sides and being parallel with each other and a linear plane of the core. The rabbet portion may include a turn segment. The turn portion may be a u-shaped turn segment. The turn portion may take on a U-type of shape and/or be considered substantially U-shaped. A pair of rabbet arms may include extensions. The extensions may each include an angled side, a point and an extension face.

The stop portion arms may include hollow segments enclosed in each arm and stop faces. The stop arms may be substantially parallel to the rabbet arms on their outer surfaces. The stop portion extensions may project into the core past the linear plane of each core side wall, into one of the recess points along the core side walls.

The inventions of the present disclosure include methods for weatherproofing a mullion for a door assembly by way of any of the embodiments disclosed.

The inventions of the present disclosure include an assembly for an extruded mullion by any of the embodiments disclosed.

These and other aspects of the inventions of the present disclosure will become apparent to those skilled in the art after a reading of the following description of embodiments when considered with the drawings.

DESCRIPTION OF EMBODIMENTS

Figure 1:
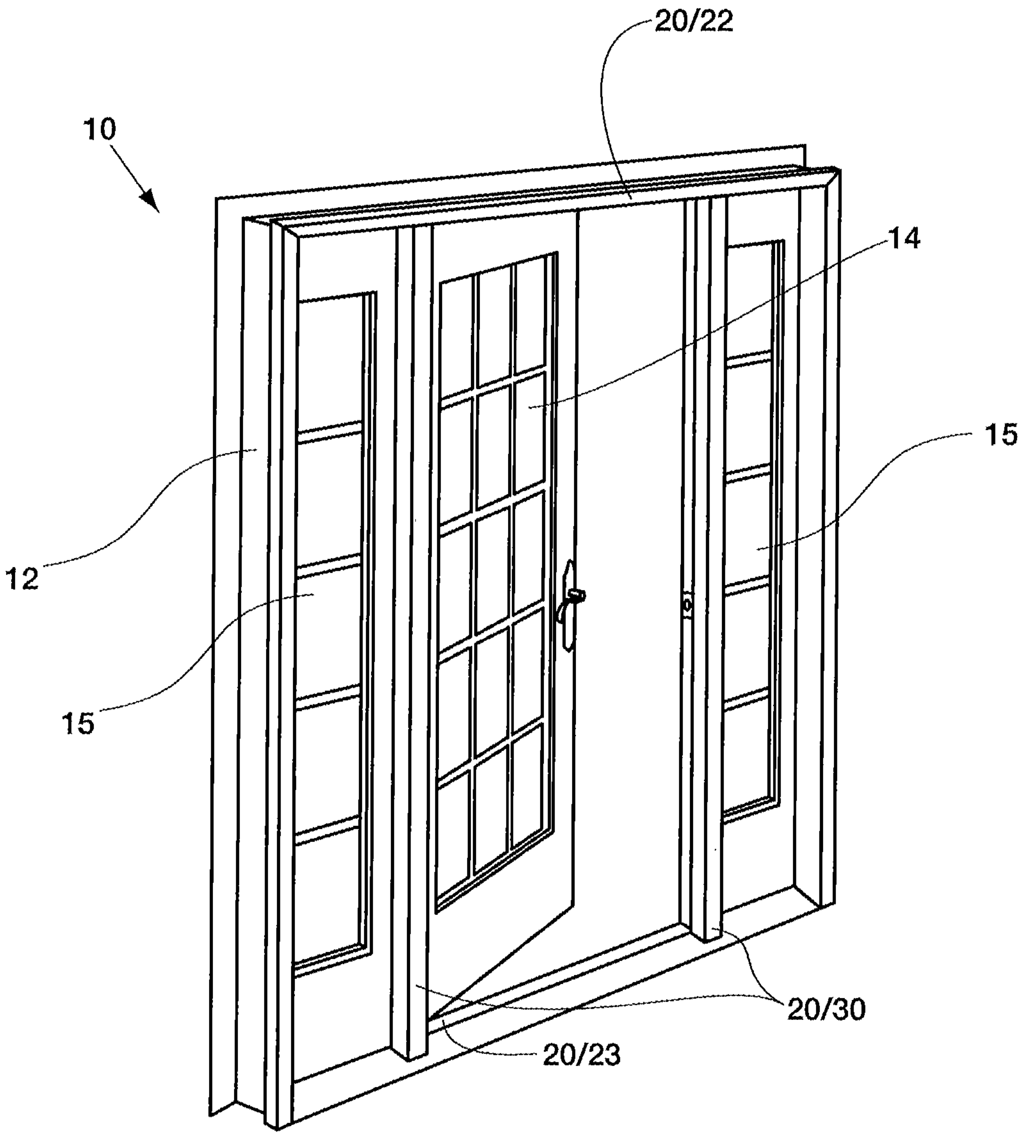
FIG. 1 is a front elevation view of one embodiment of a door assembly constructed according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As seen in FIG. 1, a door assembly, generally designated 10, is shown constructed according to one embodiment of the present disclosure. The door assembly 10 includes a door frame 12 and at least one door panel 14. The door panel may be an active panel 14. The door panel may be a passive/fixed panel 15.

The door frame 12 may include one or more frame members 20. A plurality of frame members may include any combination of a header 22, a sill 23, and/or a mullion 30. Header 22 may be generally placed toward the top of the door panel 10. Mullions 30 may be generally placed at opposing sides of the door panel 10 and/or between fixed panels 15 and active panels 14. Frame members 20 may be considered linear members sized to a door assembly. The frame members 20 may be attached using, for example, fasteners such as by way of example, screws or staples. Door panel 10 may further include hinges (not shown). Hinges may connect door panel 10 to at least one of the frame members. In another embodiment, hinges may connect door panel 10 to a mullion 30. There may be one, two, three or more hinges.

In other embodiments, the door panel 10 may also include locking hardware that enables the door panel to be secured to at least one of the frame members; for example, mullion 30. Some examples of locking hardware include latches and deadbolts.

Alternatively, door panel 10 may include locking hardware that enables it to be secured to a second door panel. More than one type of locking hardware mechanism may be used in certain embodiments; for instance, wherein at least two door panels may be used to constitute a French door assembly. In another embodiment, the door panel may be a raised panel door. The door panel, in one example, may include adjacent panels, for example, side light panels.

FIG. 1 show an example of a door assembly including at least one active door panel 14, at least one fixed door panel 15, and a door frame 12 having a plurality of frame members including a mullion 30. As seen in FIGS. 1-5, the mullion 30 may include a core 40, and a top piece 50. The top piece 50 may be a unitary top piece. The top piece 50 may be a two piece top piece. The two-piece top piece 50, may have a first stop portion 51 and a second rabbet portion 52.

The core 40 may take on an overall rectangular based shape. The core 40 may take on any suitable shape to fit within a hollow portion formed by the joining of the stop portion 51 and the rabbet portion 52. The core 40 may have a core stop end 47, a core rabbet end 48 and core side walls 41. The core side walls 41 may be a first core side wall and a second core side wall. The core side walls 41 may be linear and/or may form a plane LP along each side wall, LP1 and LP2. A plane of the first and second side walls may be parallel to each other. The core 40 may include more than one segment. The core 40 may include, by way of example, a first core segment 40*a*, a second core segment 40*b*, and/or a third core segment 40*c*. Each of the core segments may take on differing shapes. The core segments may be unitary or may be assembled from non-unitary segments. The core may include cut ends 78. The cut ends may be rounded, and/or for example, diagonal cut ends 78.

Core 40 may include recess points 44 that recess into the body toward the median of the core longitudinally, medially to the first and second linear planes LP1, LP2. Each core side wall 41 of core 40 may include a pair or more of recess points 44.

Along the core side walls 41, there may be a core intermediate wall 42. The core intermediate wall 42 may be spaced apart from the other core side walls 41 by recess points 44. The core intermediate wall 42 may be in one of the linear planes LP1, LP2. The core intermediate walls 42 may be the core side walls of second core segment 40*b*. The core intermediate walls 42 may separate the side walls 41 of the first core segment 40*a* and the third core segment 40*c*.

The stop portion 51 may fit with a core stop end 47 of core 40 and may encase a portion of the core body 40. The stop portion 51 may include a stop end 58, and a pair of stop arms 54. The stop arms 54 may include a pair of extensions 60 that project into a side wall of the core 40 to secure the stop portion 51 onto the core. The pair of extensions 60 may be on opposite sides of the core 40. The pair of extensions 60 may be opposing extensions 60.

Extensions 60 may project into the core 40, past the plane LP1, LP2 of each core side wall 41. The extensions 60 may project into a corresponding recess point 44 along the core 40. The extensions 60 may mate with the recess points 44 to secure the core 40 into the stop portion 51.

The arms 54 may have outer sides 61. The outer sides 61 may be parallel with the planes LP1, LP2 of the core 40. The arms 54 may have arm projections 56. The arm projections 56 may include stop surface 56'. The extensions 60 may be aligned with the recess points 44 to form a stabilizing joint between the stop portion 51 and the core 40. Each extension 60 may include an angled side 81, a point 83 and/or an extension face 85.

Stop portion 51 may include hollow regions 70. Stop portion 51 may include, in some examples, an internal step 76 having an internal step face 76'. In some examples, the internal step face 76' may be parallel with a plane LP 3, extending along the outer surface of the core stop end 58. The core stop end 58 may be longer than the internal step face 76'. The internal step face 76' may be longer than the stop surface 56'.

The rabbet portion 52 may include a rabbet end 59, one or more rabbet arms 53, and a rabbet outer sides 62. The rabbet outer sides 62 may be parallel with the stop outer sides 61. The rabbet arms 53 may include rabbet projections 55. The rabbet projections may include a rabbet stop surface 57. There may be a turn segment between the rabbet arms 53 and the rabbet projections 55. The turn segment 72 may be a u-shaped turn segment. In this example, the u-shaped turn segment may be configured so that the rabbet arms 53 and the rabbet projections 55 are spaced apart from and/or are parallel to one another.

Rabbet portion 52 may fit with core 40 to enclose a portion of core 40 at the core rabbet end 48. The core 40 may fit into a hollow space created within the stop portion 51 and the rabbet portion 52 when the stop portion and the rabbet portion are mated. Rabbet portion 52 may include one or more, for example, a pair of extensions 60 that project into a side wall 41 of the core 40 to secure the rabbet portion 52 to the core. The rabbet portion 52 may fit around core 40 and mate with stop portion 51. The pair of extensions may be, by way of example, considered a pair of extensions formed by two extensions projecting into the same plane, two opposed extensions, two extensions extending into separate planes, and/or two extensions extending into the core 40 on opposite sides.

The internal stop face 76' may mate with a flat side 77 of turn segment 72. The rabbet projection 55 fits between the core 40 and the arm extension 56 of the stop portion 51. In some examples, the rabbet projection 55 may fit between an intermediate wall 42 of second core segment 40*b* and an arm extension of stop portion 51. The stop face 56' and the rabbet stop surface 57 may terminate in a substantially flush plane FP, working together to form a joint stop surface 56', 57 for the mullion 30.

Figure 8:
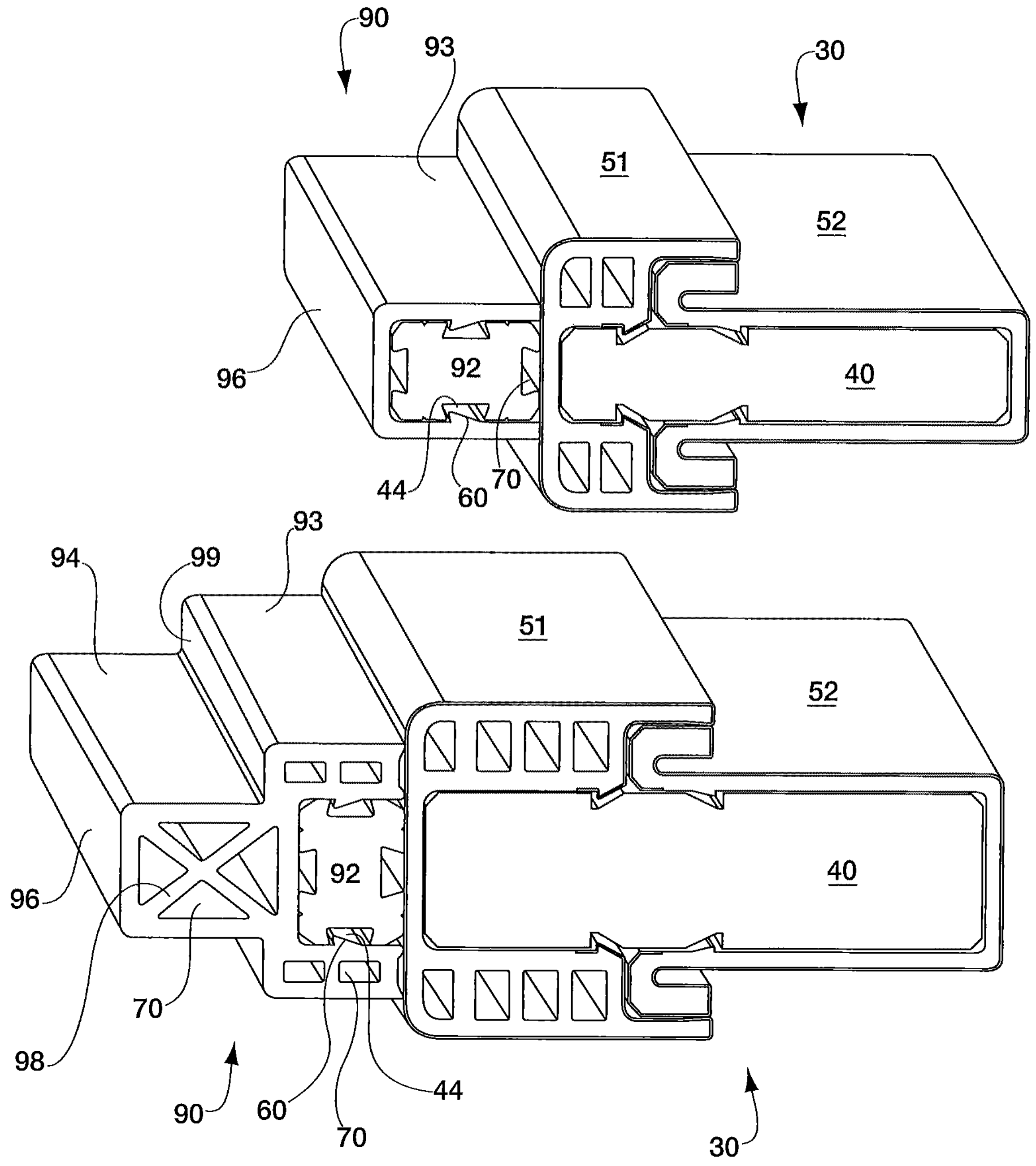
FIG. 8 is an end view of one embodiment of a mullion frame member having a core, a two-piece top piece and an extender.

Some embodiments of mullion 30 may include an extender 90. Extender 90 may extend the length of the mullion 30, for example, when needed with installations such as screen doors. Extender 90 may fit with and be secured to stop end 58. Extender 90 may include extender side walls 93 and an extender end 96. Extender 90 may also include an extender core 92, in some examples consistent with description examples of core 40 herein. The extender 90 may include hollow regions 70. Extender core 92 may take on a lobed shaping, by way of example a two-lobed shaping, and/or a four-lobed shaping, having a central core branching outwardly at each corner of the core (as seen in FIG. 8).

Extender 90 may further include a step 99 to a secondary extender part having a side wall 94, hollow portions 70, and/or supports 98.

Figure 5:
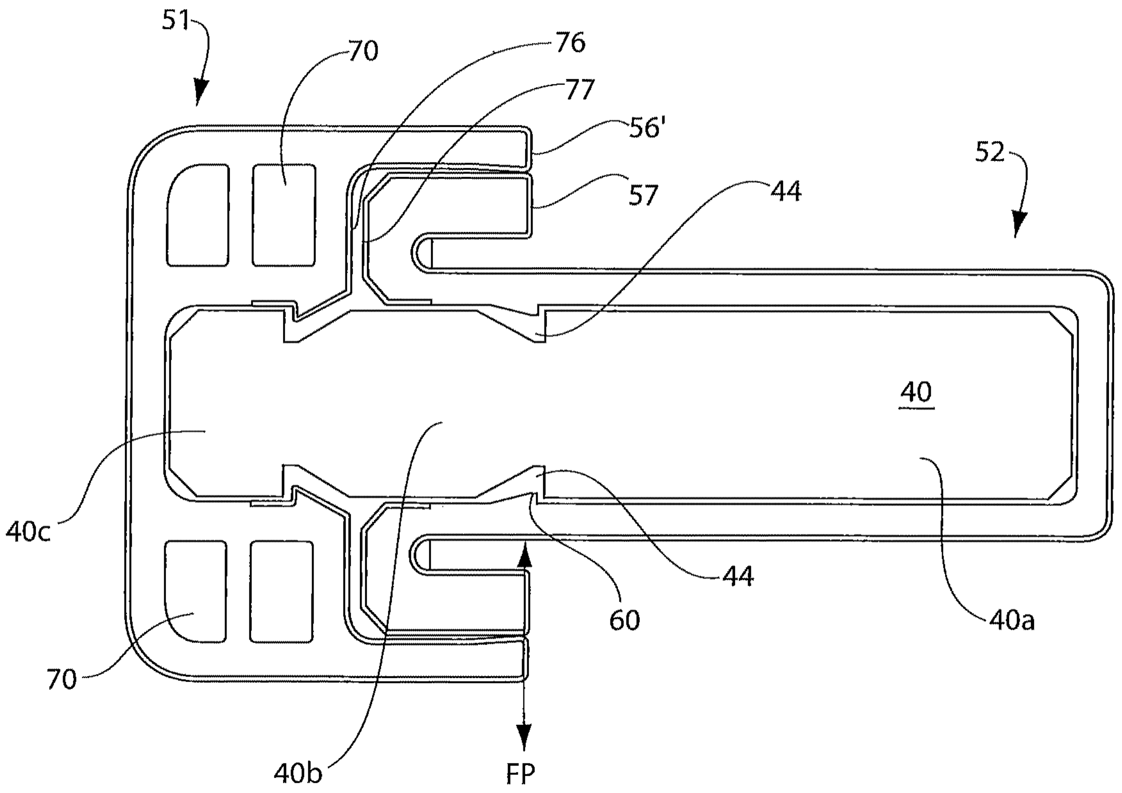
FIG. 5 is an end view of another embodiment of a mullion frame member having a core and a two-piece top piece.
Figure 6:
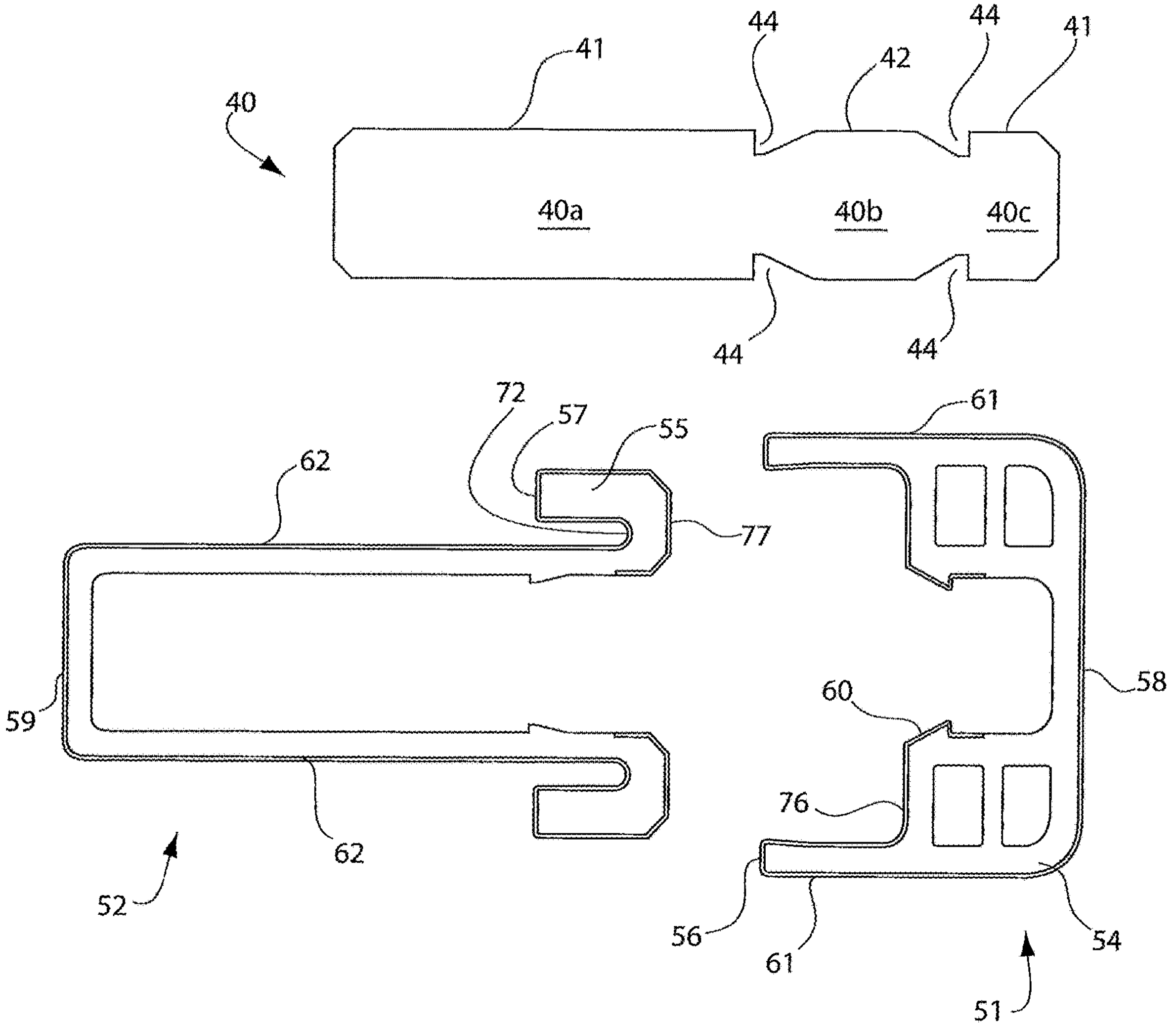
FIG. 6 is an exploded view of one example of the frame member as shown in FIG. 5.
Figure 7:
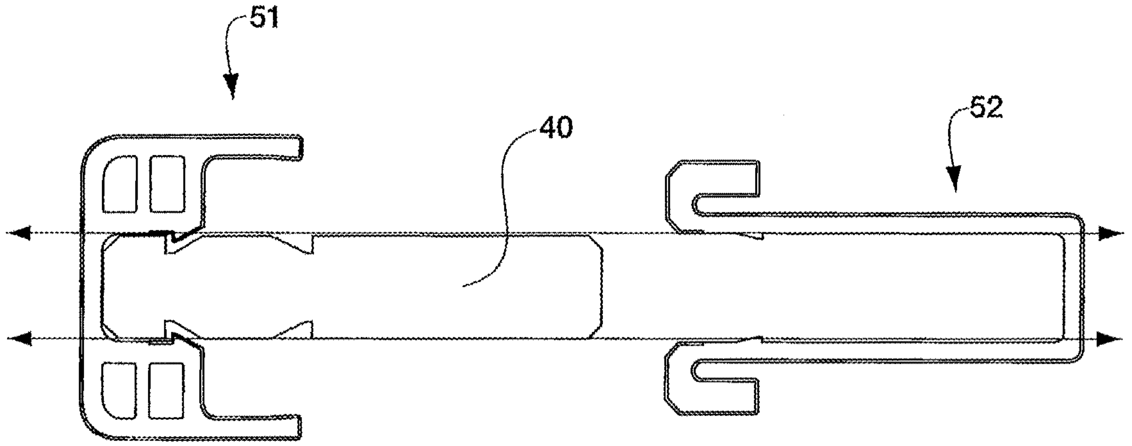
FIG. 7 is a partially assembled view of the frame member shown in FIG. 6.

In other embodiments, as shown in FIGS. 5-7 and the parts described herein, may be considered a mullion assembly for a door frame.

Binders may be used to assist in joining and securing the mullion assembly parts, for example, the stop portion 51, the rabbet portion 52, and/or the body 40. The binder may be an adhesive. In one embodiment, the binder may be an adhesive such as a hot melt adhesive. In other examples, fasteners may be used to join mullion parts, for example, staples.

Core 40 may be of a material that provides additional structural stability while top piece 50 can be included for structural stability, weatherability, and aesthetic features. Top piece 50 may also serve other functions such as protecting the core 40.

In some embodiments, top piece 50 may be one piece, two piece, and/or at least a two-piece top piece. In other embodiments top piece 50 may include additional pieces.

A slot 87 may be included in the rabbet portion 52. The slot 87 may be a weather strip slot that further includes a weather strip (not shown). Weather strips are useful for preventing water and air from entering the interior of a building by sealing the face of the door panel. The slot 87 may accept the weather strip between the rabbet arm 53 and the rabbet projection 55.

Core 40 may be of any shape with any defined length, width and depth. The two-piece top members are flexible in design and can accommodate any span of core sizes, including multiple cores. The invention includes an exterior door mullion comprised of extrusions joined to a core member. The core may be a reinforcement member.

In one embodiment the core length may be about 3¼ inches. In another embodiment the core 40 length is about 6¼ inches. In another embodiment, the core length may be from about 4" to about 8". Either the rabbet portion 52, the stop portion 51 or both can be adjusted in their respective lengths to accommodate the core's length to maintain the overlap at the arm extension 56 and rabbet projection 55. In a number of embodiments, the rabbet portion 52 is at a fixed standard length while the stop portion 51 can be accommodating and manufactured at a variety of lengths. Still, the rabbet portion 52 may also be manufactured at a variety of lengths to accommodate the needs of the application. Also considered within the scope of this disclosure is considered variable core and top-piece widths, by way of example, a mullion width of at least 1" and/or a mullion width of at least 1.5 inches. In some embodiments, the mullion width may be at least 1 inch at the rabbet portion and at least 2 inches at the stop portion.

Still in other embodiments, an overlap between the arm extension 56 and the rabbet projection 55 may be substantially medially located over the core. The location of the overlap with respect to the core 40 may depend on the dimensions of its portions. In some embodiments, as shown in FIGS. 5-7, the widths may be such that the overlap is closer to a distal end of the core 40 and/or offset from a median location of the core.

In some embodiments, the core 40 is non-metallic. By way of example, the non-metallic material may be wood. The core 40 may also further include a decay resistant material. Decay resistant materials are useful for extending the lifespan of the core, such as through preventing water damage. In one embodiment, the decay resistant material may be a cellulosic-plastic composite. The cellulosic portion of the composite may be wood fiber. The plastic portion of the composite can be a thermoplastic such as polyethylene or other plastic. In other embodiments, the entire core may include a decay resistant material. The core 40 may be entirely or partially, for example, of wood, extruded plastic, wood-plastic composite, LVL, assembled parts, etc.

The top piece 50 may also be a decay resistant material. This decay resistant material may be, for example, an extruded profile including plastic and/or a wood-plastic composite, foamed plastic and/or a cellulosic-plastic composite. In one embodiment, the cellulosic portion of this composite is a wood fiber. In another embodiment, the plastic portion of the composite is a thermoplastic such as polyvinyl chloride. The top piece 50 may be considered a rigid, hollow extrusion blend of at least any of the ingredients disclosed.

The amount of cellulosic material may vary within the top piece composite. In one embodiment, the top piece composite is between about 20 weight percent and about 70 weight percent of the weight of the cellulosic-plastic composite. In another embodiment, the amount of cellulosic material within the composite is about 35 weight percent of the total weight of the cellulosic-plastic composite. The thickness of the top piece 30 may also vary among different embodiments of the invention. In one example, the thickness of the top piece 30 is between about 10% and about 50% of the thickness of the total frame member, including the core. In one embodiment, the thickness of the top piece 30 is about 30% of the thickness of the door frame member 29.

Figure 9:
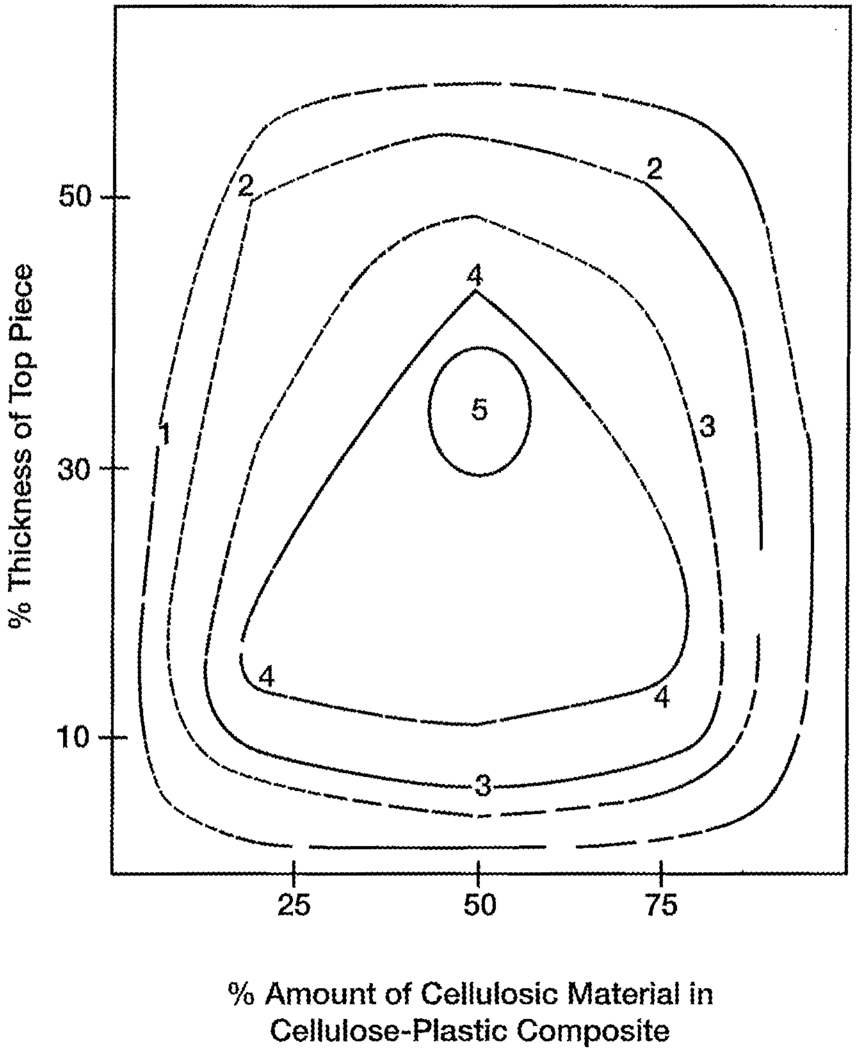
FIG. 9 is a graphical representation of a response surface illustrating the relationship of the thickness of the top piece and the amount of cellulosic material in the cellulose-plastic composite on the performance of a frame member constructed according to the present disclosure.

FIG. 9 is a graphical representation of a response surface illustrating the relationship between the percent thickness of the top piece and the amount of cellulosic material in embodiments where the top piece is a cellulosic-plastic composite. Percent thickness of the top piece is defined as the thickness of the top piece with respect to the total thickness of the frame member. The response surface provides a visual illustration of the effects of both thickness and percent amount of cellulosic material within the composite via a two-dimensional surface plot of a three-dimensional surface. The boundary conditions in FIG. 9 are denoted with dashed lines, and indicate a minimum percent thickness and a percent amount of cellulosic material for use with some examples within the present disclosure.

Accordingly, in this example, the expected characteristics of various embodiments of top piece 50 were plotted and zones on the response surface were ranked from 1 to 5, with 1 being the poorest performing top pieces and 5 being the best performing top pieces in terms of strength, durability and resistance to decay.

The door assembly 10 may further include a sill located underneath the door panel. In other embodiments, the door assembly includes two door panels separated by way of example an astragal and/or a mullion 50. In yet other embodiments, the frame members described herein are not necessarily limited to door jambs and mullions and may alternatively be used for other assemblies such as windows.

Frame members 20 may also include one or more cappings (not shown), a capping being an additional layer covering an outer surface of a frame member. A capping may be co-extruded with top piece 50, and is not necessarily limited to one layer. Alternatively, capping may be independently extruded to fit on top of a frame member and may cover at least a portion of a frame member. In one embodiment, the capping is a thermoplastic such as polyvinyl chloride. In another embodiment, a capping may be a composite of two or more materials. The composite of capping may be comprised of a thermoplastic with a cellulosic filler such as wood. In other embodiments, capping can be made of plastic without cellulosic filler, with another type of filler, or include a blowing agent. The capping may be a weather/UV resistant co-extruded layer for placement on the outer surface of the top piece 50. In some examples, the capping may include a design, by way of example, an embossed texture resembling a wood grain.

In other embodiments, a capping may be placed onto core 40 without and/or in place of all or a part of top piece 50. Capping may comprise two or more pieces, but in other embodiments, may comprise one piece covering at least a portion of core 40.

Figure 2:
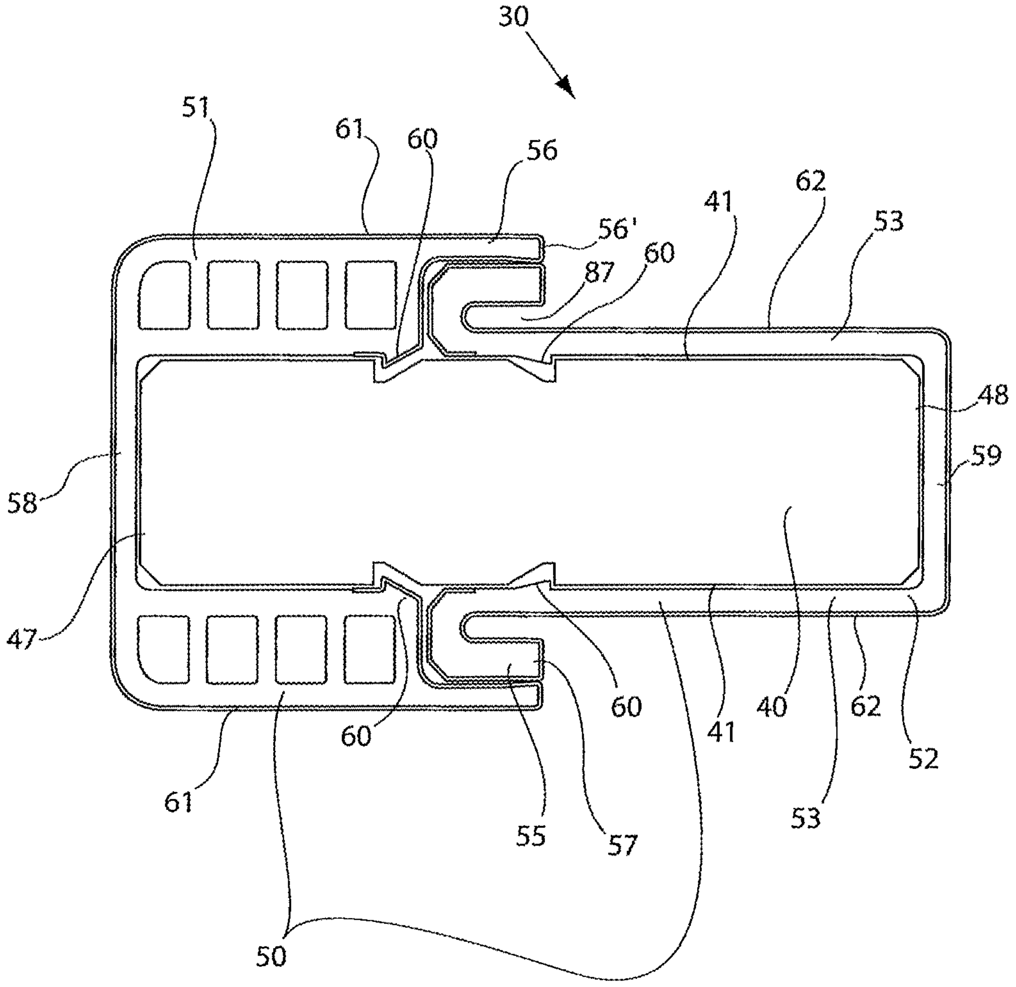
FIG. 2 is a cross-sectional view of one embodiment of a mullion frame member having a core and a two-piece top piece.
Figure 2A:
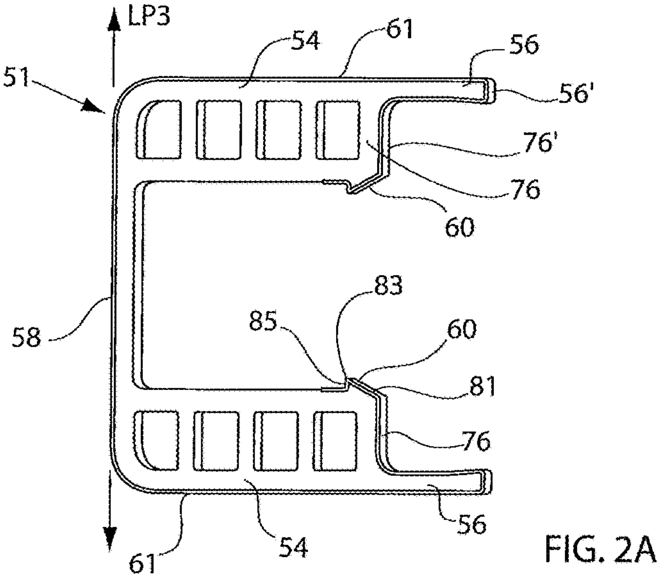
FIG. 2A is a perspective view of one example of a stop portion of the mullion frame member of FIG. 2.
Figure 2B:
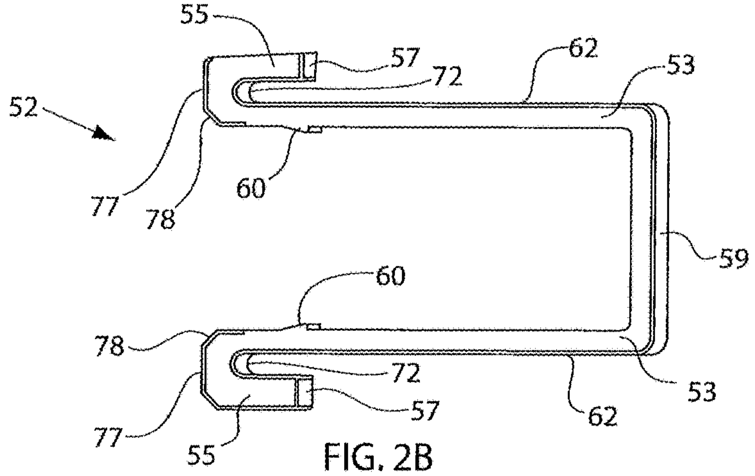
FIG. 2B is a perspective view of one example of a rabbet portion of the mullion frame member of FIG. 2.
Figure 2C:
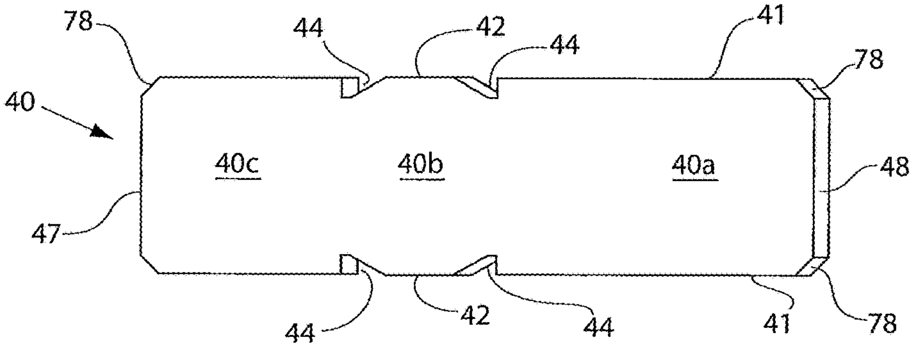
FIG. 2C is a perspective view of one example of a core of the mullion frame member of FIG. 2.
Figure 3:
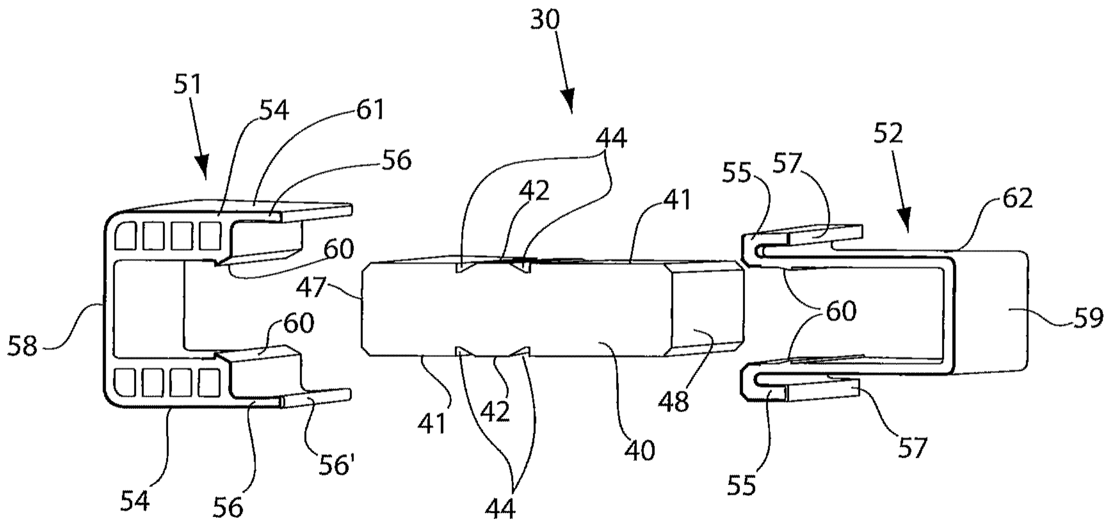
FIG. 3 is an exploded view of the frame member shown in FIG. 2.
Figure 4:
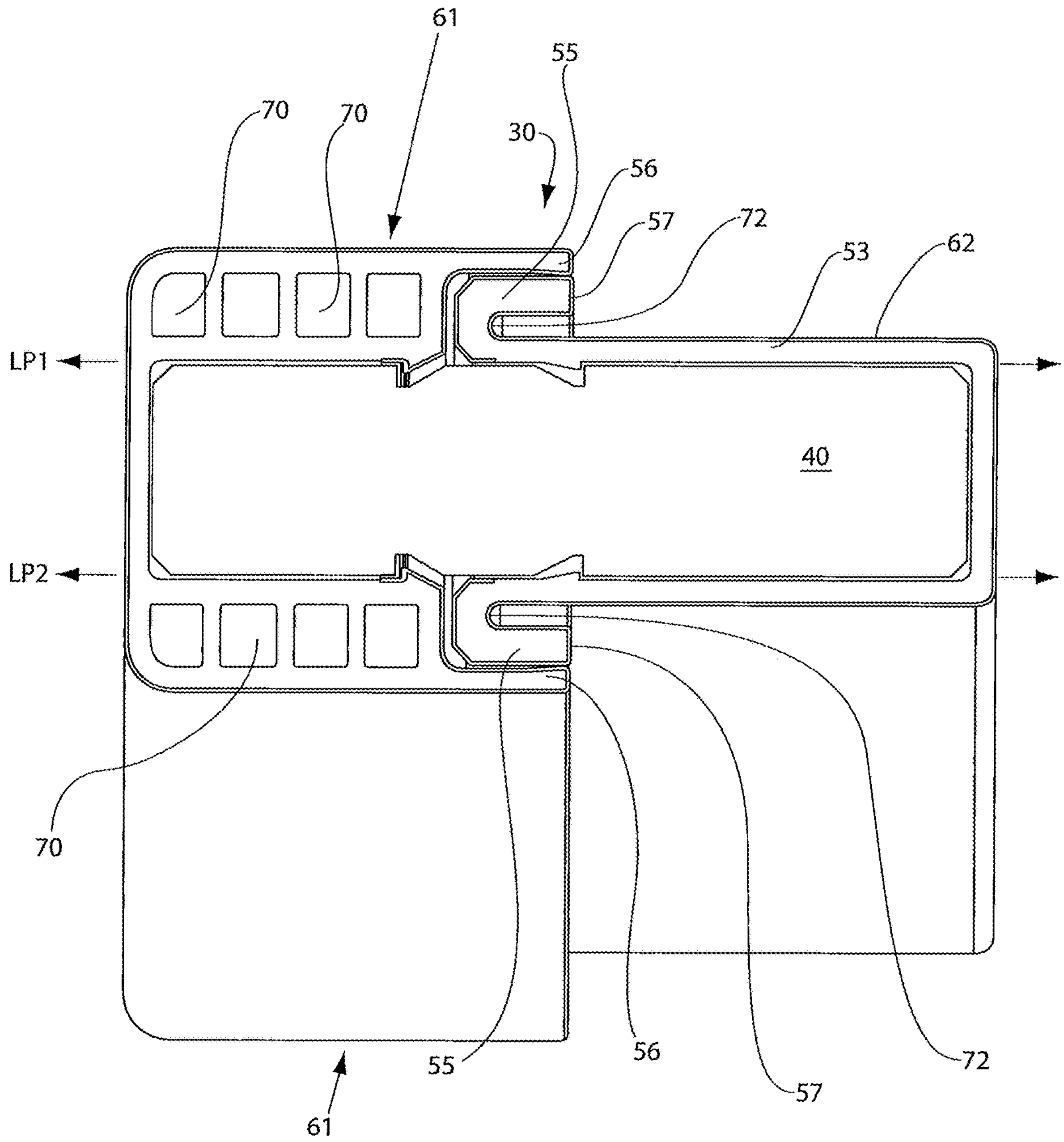
FIG. 4 is a side perspective view of one embodiment of the frame member shown in FIG. 2.

Also disclosed is a new, original and ornamental design for a mullion, of which the following is a specification, reference being had to the accompanying drawings in general and specifically, FIG. 2 showing a cross-sectional end view of one embodiment of a mullion; FIG. 3 showing an exploded perspective view of one embodiment of a mullion frame member having a core and a two-piece top piece; FIG. 4 showing a perspective side view of the mullion frame member; FIG. 1 showing a front elevation view of an embodiment of a door assembly with a mullion frame member installed and shown; FIG. 8 showing a cross-sectional end view of a mullion including examples of extenders.

Certain modifications and improvements will occur to those skilled in the art upon a reading of the foregoing description. By way of example, the top piece can be of a unitary construction. The thickness of the top piece can be less than 10% of the total thickness in other embodiments. The plastic portion of the top piece may comprise all polyvinyl chloride. Moreover, the top piece can be made of plastic without cellulosic filler, with another type of filler, or include a blowing agent. Alternatively, the core's lower portion may be made from plastic with/without cellulosic filler, with another type of filler, or include a blowing agent. It should be understood that all such modifications and improvements have been deleted herein for the sake of conciseness and readability but are properly within the scope of the following claims.

We claim:

1. A door mullion comprising:

a core including a core stop end, a core rabbet end, a first core side wall, and a second core side wall;

a first set of recess points extending into the first core side wall and a second set of recess points extending into the second core side wall opposing the first set of recess points to form a first pair of opposing recess point and a second pair of opposing recess points;

a top piece enclosing the core, the top piece including a stop portion and a rabbet portion; and a set of extensions extending inwardly from the top piece, and each extension of the set of extensions mating with a respective recess point of the first set of recess points or the second set of recess points along the first core side wall or along the second core side wall to secure the top piece to the core, the stop portion and the rabbet portion of the top piece configured to be engaged by an exterior face of a door.

2. The door mullion of claim 1, wherein each core side wall includes a linear plane along an outer surface of each core side wall.

3. The door mullion of claim 2, wherein the top piece is a two-piece top piece.

4. The door mullion of claim 2, wherein the stop portion includes a set of stop extensions extending inwardly from the top piece, and wherein the rabbet portion includes a set of rabbet extensions extending inwardly from the top piece.

5. The door mullion of claim 4, wherein each set of the stop extensions and the rabbet extensions align with a respective pair of opposing recess points along each core side wall.

6. The door mullion of claim 5, wherein the stop portion includes a pair of stop extensions that project into a respective side wall of the core to secure the stop portion onto the core, and the rabbet portion includes a pair of rabbet extensions that project into a respective side wall of the core to secure the rabbet portion to the core.

7. The door mullion of claim 6, including a stop surface formed in part by an arm of the stop portion and in part by an arm of the rabbet portion.

8. The door mullion of claim 7, wherein the stop portion includes at least one hollow segment enclosed within each arm.

* * * * *